US012495960B2

(12) United States Patent
Cha et al.

(10) Patent No.: US 12,495,960 B2
(45) Date of Patent: Dec. 16, 2025

(54) SYSTEM AND METHOD FOR INTRAOPERATIVE, NON-INVASIVE NERVE IDENTIFICATION USING SNAPSHOT POLARIMETRY

(71) Applicant: CHILDREN'S NATIONAL MEDICAL CENTER, Washington, DC (US)

(72) Inventors: Jaepyeong Cha, Washington, DC (US); Bo Ning, Washington, DC (US)

(73) Assignee: CHILDREN'S NATIONAL MEDICAL CENTER, Washington, DC (US)

( * ) Notice: Subject to any disclaimer, the term of this patent is extended or adjusted under 35 U.S.C. 154(b) by 739 days.

(21) Appl. No.: 17/426,884

(22) PCT Filed: Jan. 31, 2020

(86) PCT No.: PCT/US2020/016161
§ 371 (c)(1),
(2) Date: Jul. 29, 2021

(87) PCT Pub. No.: WO2020/160439
PCT Pub. Date: Aug. 6, 2020

(65) Prior Publication Data
US 2022/0117476 A1      Apr. 21, 2022

Related U.S. Application Data

(60) Provisional application No. 62/800,185, filed on Feb. 1, 2019.

(51) Int. Cl.
*A61B 1/04*         (2006.01)
*A61B 1/06*         (2006.01)

(52) U.S. Cl.
CPC ............. *A61B 1/0646* (2013.01); *A61B 1/04* (2013.01); *A61B 1/0638* (2013.01)

(58) Field of Classification Search
CPC ....... A61B 1/0646; A61B 1/04; A61B 1/0638; G01N 2021/178; G01N 21/23
See application file for complete search history.

(56) References Cited

U.S. PATENT DOCUMENTS

| 5,416,324 A | 5/1995 | Chun |
| 2002/0091323 A1* | 7/2002 | Dreher ................... A61B 3/12 600/476 |

(Continued)

OTHER PUBLICATIONS

Jaepyeong Cha et al. "Real-time, label-free, intraoperative visualization of peripheral nerves and micro-vasculatures using multimodal optical imaging techniques", Biomedical Optics Express, vol. 9, No. 3, Mar. 2018, p. 1097-1110 in view of Dreher (US 2002/0091323 A1; pub. Jul. 11, 2002). (Year: 2018).*

Mikko "Development of a Novel High Resolution Optical Neuroimaging method", Master of Science Thesis, Computing and Electrical Engineering Faculty Council meeting Mar. 3, 2010, p. 1-75. (Year: 2010).*

(Continued)

*Primary Examiner* — David P Porta
*Assistant Examiner* — Mamadou Faye
(74) *Attorney, Agent, or Firm* — Oblon, McClelland, Maier & Neustadt, L.L.P.

(57) ABSTRACT

The present disclosure relates to non-invasive nerve identification using snapshot polarimetry. The present disclosure further relates to a system for nerve identification, the system comprising a camera including a sensor, and a filter having a linear polarizer array, an illumination system configured to illuminate a target area with polarized light illumination, the polarized light illumination having at least one predetermined polarization angle, the illumination system including one more light sources, and one or more polarizer filters, and a processor configured to process imaging data obtained from the camera, and output a bire- (Continued)

fringence map of the target area including indicia of a nerve structure.

20 Claims, 8 Drawing Sheets

(56) References Cited

U.S. PATENT DOCUMENTS

| | | | |
|---|---|---|---|
| 2004/0061834 A1 | 4/2004 | Zhou et al. | |
| 2006/0082781 A1* | 4/2006 | Chan | A61B 5/4041 356/495 |
| 2009/0153798 A1* | 6/2009 | Dick | A61B 5/0261 351/221 |
| 2010/0302507 A1* | 12/2010 | Desgroseilliers | A61B 3/14 351/246 |
| 2015/0100012 A1* | 4/2015 | Muller | A61N 5/062 604/20 |
| 2018/0000341 A1 | 1/2018 | Tomatsu et al. | |
| 2021/0271061 A1* | 9/2021 | Fukazawa | A61B 1/045 |

OTHER PUBLICATIONS

International Search Report and Written Opinion issued on Apr. 29, 2020 in PCT/US2020/016161 filed on Jan. 31, 2020.

Cha, J. et al., "Real-time, label-free, intraoperative visualization of peripheral nerves and micro-vasculatures using multimodal optical imaging techniques," Biomedical Optics Express, vol. 9, No. 3, 2018, pp. 1097-1110.

Extended European Search Report issued Sep. 8, 2022, in corresponding European Patent Application No. 20747604.5, 9 pages.

Mariane B. Mellem-Kairala et al., "Improved Contrast of Peripapillary Hyperpigmentation Using Polarization Analysis", Investigative Ophthalmology & Visual Science, Mar. 2005, vol. 46, No. 3, XP-002639338, pp. 1099-1106.

European Office Action issued on Oct. 20, 2023 in European Patent Application No. 20 747 604.5, 7 pages.

4D Technology: "PolarCam™ Snapshot Micropolarizer Camera", Feb. 19, 2018, pp. 1-2, XP93091242, Retrieved from the Internet: URL:https://www.4dtechnology.com/wp-content/uploads/PolarCam-Data-Sheet.pdf.

* cited by examiner

SYSTEM AND METHOD FOR INTRAOPERATIVE, NON-INVASIVE NERVE IDENTIFICATION USING SNAPSHOT POLARIMETRY

CROSS-REFERENCE TO RELATED APPLICATIONS

The present application claims priority to U.S. Provisional Application No. 62/800,185, filed Feb. 1, 2019, the teaching of which is incorporated by reference herein in its entirety for all purposes.

BACKGROUND

A nerve is defined as a bundle of fibers composed of neurons. It connects the body parts and organs to the central nervous system and transmits sensory and motor information via electrical and chemical signals. Neuropathy or nerve damage can present as various symptoms depending on the location and type of nerves that are affected. Among them, motor nerve injury occurring during surgery would be disastrous. Facial nerve injury during head and neck surgery results in facial paralysis including asymmetry of facial expression, difficulty eating or drinking, loss of blinking control, and drooping of the mouth on the affected side. Damage of the recurrent laryngeal nerve (RLN) during thyroidectomy could induce paresis or palsy of the vocal cord. Injury of the RLN of both sides cause airway obstruction, and might result in the requirement for a tracheostomy. Pelvic nerve injury after radical rectal cancer surgery can cause urinary dysfunction (~0.27%) or sexual dysfunction (11-55%).

At present, nerve identification and avoidance of iatrogenic trauma relies heavily on the surgeon's knowledge of anatomy and experience of delicate dissection techniques. Despite best efforts to preserve nerves, accidental nerve injuries are sometimes inevitable. Reports show that 17% of the total number of reported nerve injuries occur unexpectedly during surgical interventions, which indicates a substantial number worldwide. This is mainly due to the difficulty in differentiating nerves from the surrounding tissues such as fat, lymphatic tissues, small blood vessels, and other connective tissues, which have similar colors. In the case of tumors, nerve tissue is embedded within the tumor tissue. In particular, smaller branches of nerves are extremely hard to identify intraoperatively by the naked eye because of the complexity of their distributions and orientations.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 41B is a schematic that shows RGB images and birefringence maps of (a) superior laryngeal nerve (SLN) in a swine neck and (b) femoral nerves in a right leg of a swine in vivo;

DETAILED DESCRIPTION

Figure 1A:
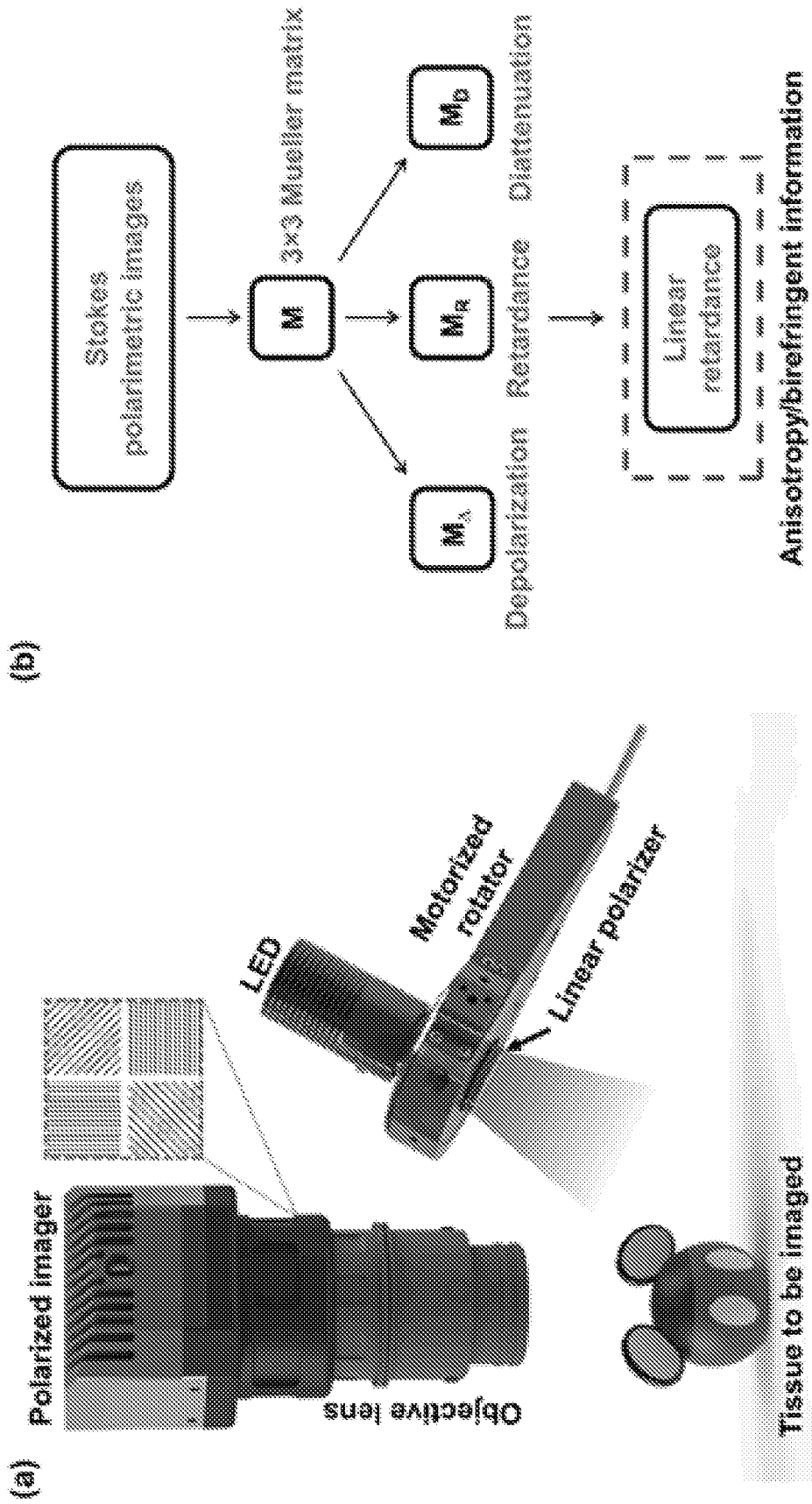
FIG. 1A is a schematic that shows a mechanism of the practical polarimetric imaging method. (a) System schematic of the overall platform. (b) Calculation flow to derive the birefringence map from the output of the linear polarizer array camera. Mesh rectangle in (a) illustrates the positions and orientations of the polarization filters for each 4-pixel block.

Referring now to the drawings, wherein like reference numerals designate identical or corresponding parts throughout several views, the following description relates to a system, a device, and associated methodology for intraoperative non-invasive nerve identification. A full field birefringence map is obtained and used to highlight nerve structures in an operative field.

Electrical nerve stimulation has been used to identify nerves. However, even blunt dissection may lead to severe nerve injury, and the use of an electrical probe is invasive and can create distractions during surgical procedures. Fluorescent markers can be a good alternative to highlight nerve structures but no suitable dyes are as yet clinically available, and there are concerns about procedural complexity and the potential toxicity of the use of fluorescent markers intraoperatively. Significant advances in nerve identification have been demonstrated using optical coherence tomography (OCT) imaging; however, although OCT allows high-resolution deep-penetration 3D mapping, the images have a small field-of-view, and it requires a bulky sophisticated optical system, making it of limited practical use during operations.

Polarimetry has been widely used in biomedical applications and this technique holds great potential to address the unmet challenge of intraoperative nerve imaging. Nerves possess intrinsic anisotropic structures within the myelin and demonstrate strong birefringence, which points to a straightforward way to characterize and visualize them. Capitalizing on analysing the polarization of detected photons, polarimetric imaging allows direct measurement of birefringence without any invasive procedures. There have been numerous promising methods using polarimetric imaging for tissue characterization, but the published studies have thus far been limited to ex vivo conditions, potentially due to system complexity and other restrictions such as motion artifacts.

Conventionally, polarimetry requires multiple repeated data acquisition steps and processing to calculate Mueller and Stokes matrices. Thanks to recent technological advances, a compact camera with four sets of linear polarizer arrays is commercially available, permitting fast, high-definition polarimetric imaging via simple snapshots. Exploiting this camera, we have developed a practical polarimetric imaging method that allows a fast Mueller polarimetric analysis and can process birefringence maps over the entire field of view (FOV) in near real-time. The method was intraoperatively tested by identifying various nerves in rodents in vivo and in swine in situ. The results show that sciatic and phrenic nerves in rats can be clearly identified by exhibiting their intrinsic bands-of-Fontana structures. We also demonstrate that in pigs the platform could differentiate superior laryngeal nerves (SLN) and peripheral nerves from surrounding tissues by mapping the birefringence. With future improvements in processing speed, this practical polarimetric imaging method could potentially provide a useful tool for intraoperative nerve visualization.

FIG. 1A(a) depicts the system setup for Mueller polarimetric imaging using a linear polarizer array camera. The polarimetric camera is used as a polarization state analyser (PSA), and a simple polarization state generator (PSG) is also applied using a motorized linear polarizer. The polarimetric camera consists of a filter with a pixelated linear polarizer array in front of the sensor. As shown in the dash-outlined rectangle in FIG. 1A(a), the sensor and filter were carefully aligned so that every four adjacent pixels of the sensor is precisely overlaid by four different tiny linear polarizers, of which the angles of the axes are 0° 45°, 90°, and 135° degrees, respectively. The first three elements of a Stokes vector, which represent the entirety of the polarization state except the circularity, can be directly measured. Although complete Stokes vectors could become measurable by adding a controllable retarder, it would increase the complexity of the system and thus make it less practical. In consequence, we can only resolve a 3×3 Mueller matrix for each set of 2×2 pixels, but this is nonetheless sufficient to reveal important polarization information about the tissues, including their birefringence. Moreover, reducing the Mueller matrices also significantly reduces the requirements for the PSG, which consists of a low-power LED, a motorized rotator, and a linear polarizer, in our system. In an embodiment, the PSG may include one or more low-power LEDs and one or more linear polarizers. The PSG generates polarized-light illumination, with linear polarization angles of 0°, 45°, and 90°, respectively, to derive the 3×3 Mueller matrices for each set of 2×2 pixels. A wavelength of the illumination source may be selected to ensure good penetration capacity and to minimize interference with vision of a surgeon. In an embodiment, the wavelength of the illumination source may be between 400 nm and 2500 nm. In an example, the wavelength of the illumination source may be 730 nm. Three snapshots of the polarimetric camera are needed for each of the three different polarized illuminations. After the pixel-wise Mueller matrices are derived, an established polar decomposition method can be applied to calculate the phase retardance between the fast and slow axes of the birefringence (FIG. 1A(b)), which should be positive overall in nerves due to their fibrillar structure.

Figure 1B:
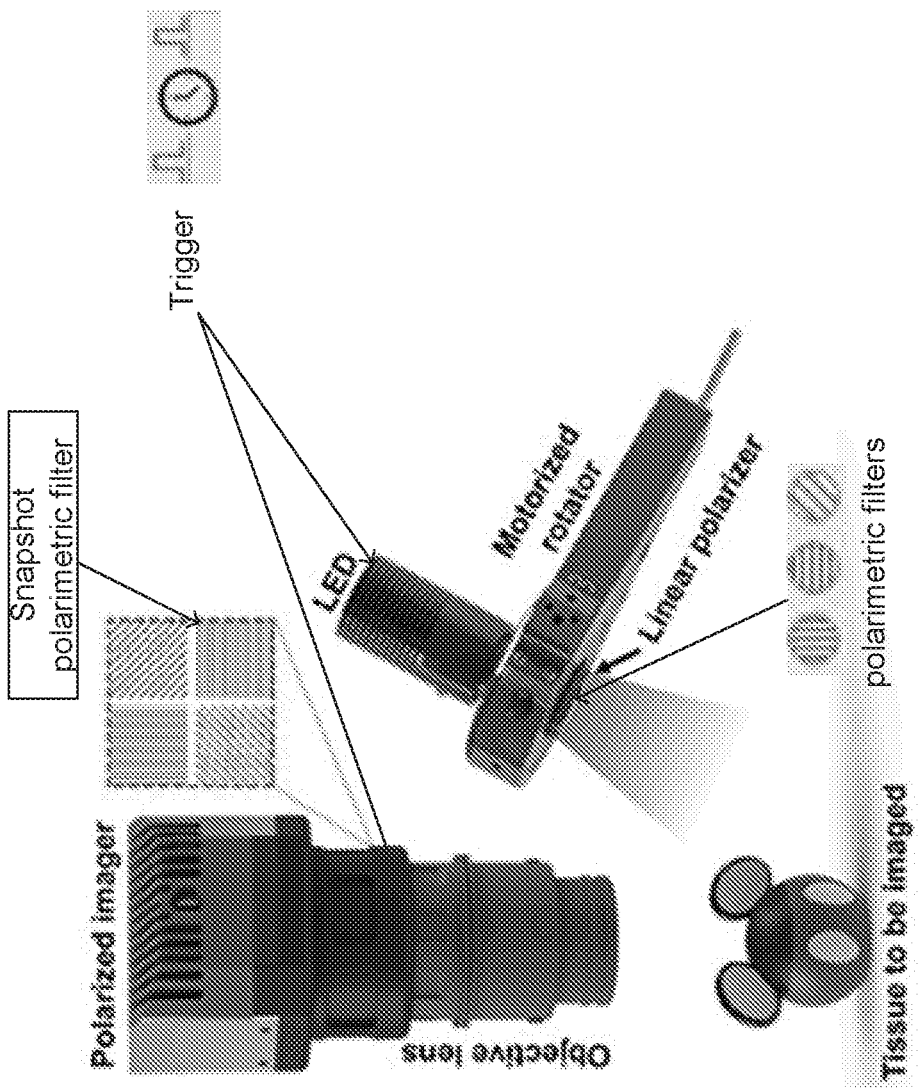
FIG. 1B is a schematic of the overall platform for real-time snapshot imaging. A trigger command may be sent to concurrently activate the illumination system on and initiate camera data acquisition. Therefore, the switching of three different linearly polarized illuminations can be synchronized with camera acquisition in a single cycle. In this way, real-time snapshot imaging and birefringence map processing can be realized.

FIG. 1B provides further details regarding the system setup. In particular, this figure additionally illustrates a circuitry that permits real-time imaging by triggering signals to an illumination system and a camera, synchronously. The illumination light source includes coaxial, three different linearly polarized filters with predetermined angles. A circuitry can send the trigger signals to control the timing of taking snapshot images from the camera and the switching of polarized light sources. In this manner, the real-time acquisition is achieved and it eliminates motion artefacts that may be introduced by the subject. There are several ways to achieve the switching of the polarizations. One way is to use one light source and one polarimetric filter, for example, a linear polarizer, and rotate the filter before taking each snapshot at a fast rate. Another way is to use multiple light sources that are co-axially aligned and equipped with three linearly polarized filters in front of each light source. The angles of the linearly polarized filters are fixed and predetermined corresponding to the desired angles of 0°, 45°, and 90°, respectively. Therefore, the rapid switching of the linearly polarized illumination can be achieved by triggering the polarized light sources at predetermined speed.

See Methods for more technical details about the system setup and calculation flow.

We used phantoms to examine the feasibility of the system and test its performance; first of all, the goal was to check that only minor birefringence was induced by the optical components in the optical setup. We used a linear polarizer (LPVISE100-A, Thorlabs, U.S.A.), with extinction ratio ~18000:1 at 730 nm, placed on top of white paper as the object.

Figure 2:
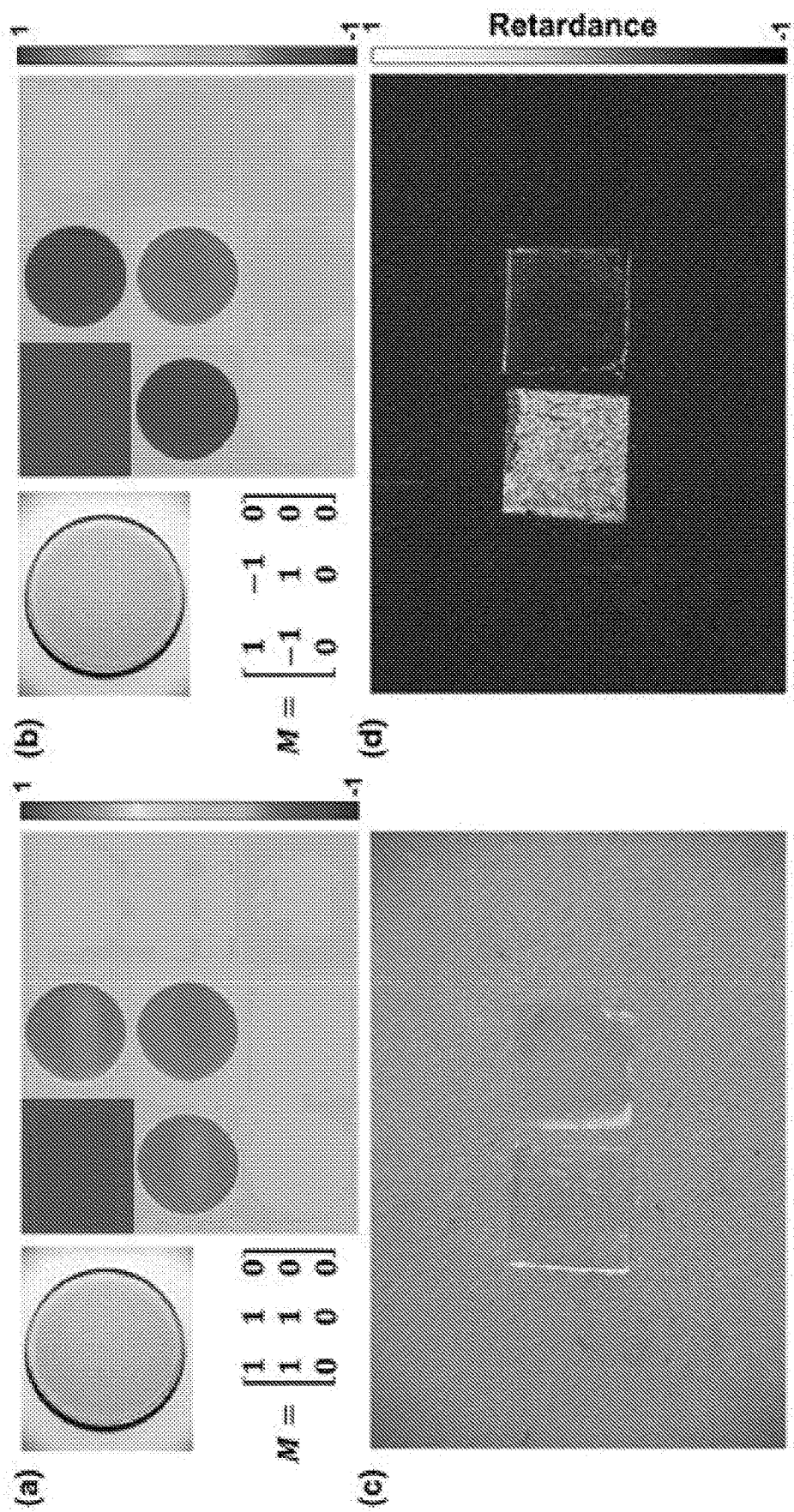
FIG. 2 is a schematic that shows a performance evaluation of the imaging method described herein on phantoms. (a) Expected (lower left) and measured (right) Mueller matrix from imaging a horizontally oriented linear polarizer; a monochromatic image of the polarizer is also shown (upper left). (b) Expected (lower left) and measured (right) Mueller matrix from imaging a vertically oriented linear polarizer; a monochromatic image of the polarizer is also shown (upper left). (c) Monochromatic image of birefringent and normal plastic films on a tissue-mimicking pad and (d) birefringence map of the films acquired using the method described herein.

We compared the derived Mueller matrices using the polarimetric camera and the theoretical matrices for the polarizer oriented at approximately 0° and 90° (FIGS. 2(a) and 2(b)). The comparison of these two results indicates good agreement between the measured and theoretically expected values of the elements in the Mueller matrices. The minor mismatches could perhaps result from an imperfect installation of the setup or some small diattenuations within it. The overall good performance validates the feasibility of this polarimetry design.

To further test the birefringence detection performance of the system, we used conventional plastic and birefringent films to mimic non-birefringent and birefringent tissues respectively. The two pieces of these films are very similar in dimensions, with thicknesses for both of ~70 μm. We placed the films on a commercial soft-tissue mimicking pad (3-DMED USA.) and employed the polarimetric imaging method described herein to visualize their differences. The fast axis of the birefringent film is parallel to one of its edges. As shown in FIGS. 2(c) and 2(d), although in the monochromatic images the two pieces of film look very similar to each other, a significant difference in their birefringence properties can be detected. This experimental result indicates that the polarimetric imaging method described herein is capable of mapping birefringence with adequate sensitivity.

Figure 3:
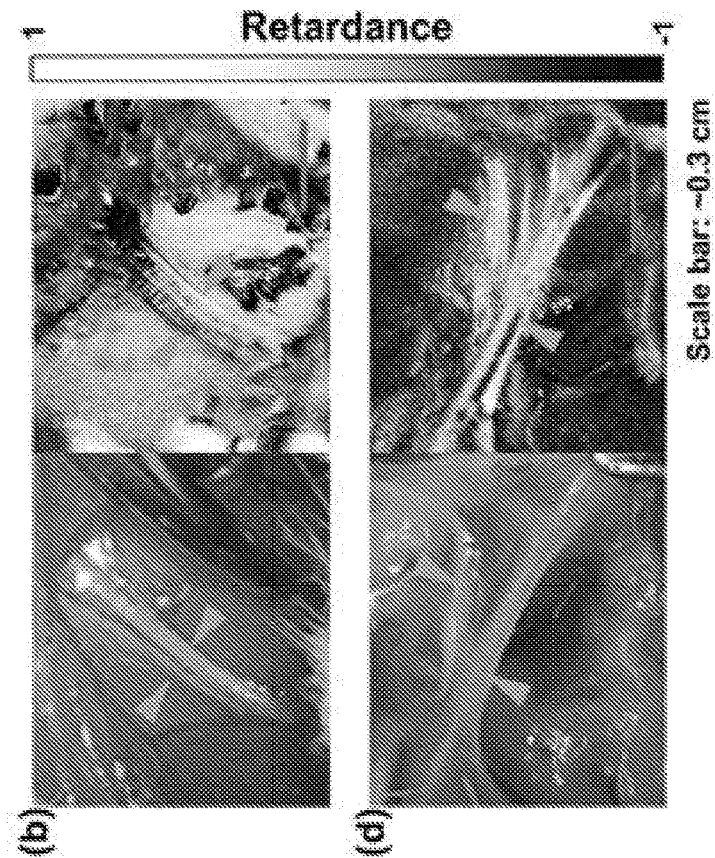
FIG. 3 is a schematic that shows RGB images (left) and birefringence maps (right) of four different regions that include nerves in anesthetized rats. Nerves were carefully pre-identified before polarimetric imaging was performed (green arrows, overlaid on both the RGB and birefringence images). Results from different-sized femoral nerves are shown in (a) and (b). (c) The main branches of the phrenic nerves are shown in (c), and (d) shows subsidiary branches of the same.
Figure 3:
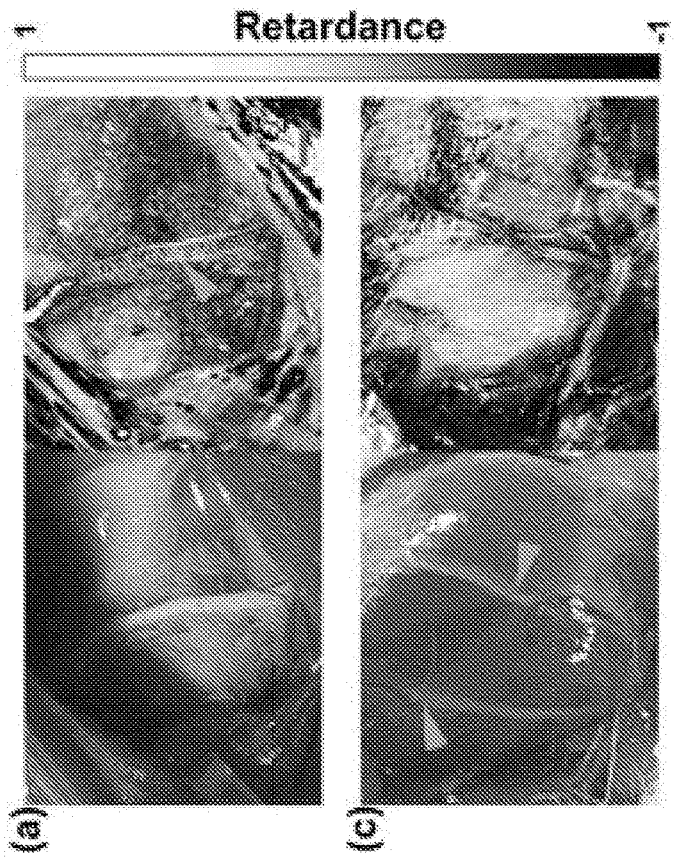

As a first test of the nerve identification method, we carried out in vivo experiments on anesthetized rats. We first focused on nerves which are easily recognized by experienced surgeons and animal handlers. Conventional RGB photographs were also taken at the same time, for reference and comparison. After the confirmation of stable anaesthesia, we carefully exposed the femoral nerve—a part of the sciatic nerve, and a peripheral nerve with motor neurons—with the inguinal ligaments. Polarimetric imaging was then performed. A high-magnification zoom lens was used for imaging so that the FOV and magnification could be conveniently adjusted; its working distance was approximately 22 cm for all the tests. Strong positive birefringence can be detected from both nerves and smooth muscle (FIGS. 3(a) and 3(b)), as the smooth muscle also consists of massive fibrillar structures. Nevertheless, the bands of Fontana, which is a feature unique to peripheral nerves, were clearly revealed by the birefringence map. The detection of bands of Fontana can therefore be used as a strong indicator of the location of a nerve, isolating the nerve structure from any muscle-induced birefringence background signals. By applying this strategy, we were able to easily identify all the femoral nerves using the birefringence maps.

We also performed polarimetric imaging on parts of the phrenic nerves using a larger FOV after surgical dissections on the necks of the rats were performed to expose them. Similar phenomena were observed. Although strong birefringence was also detected here from the surrounding smooth muscles, we were easily able to identify the nerves by visualizing the bands of Fontana (FIG. 3(c)). The birefringence map also demonstrates that nerves that are significantly separated in space can be identified simultaneously. To test the imaging performance with higher magnifications for smaller nerves, we traced the phrenic nerves to their subsidiary branches near the neck and collected a polarimetric image (FIG. 3(d)) with a small FOV. The results show that two sections of the small subsidiary branches of the nerves are detectable by their birefringence. Bands of Fontana in the upper branch can be clearly observed, while they are unclear in the other branch; this could be because the epineurium is thicker for certain parts of nerves, so that it becomes more difficult to reveal the fine structure beneath it.

Figure 4A:
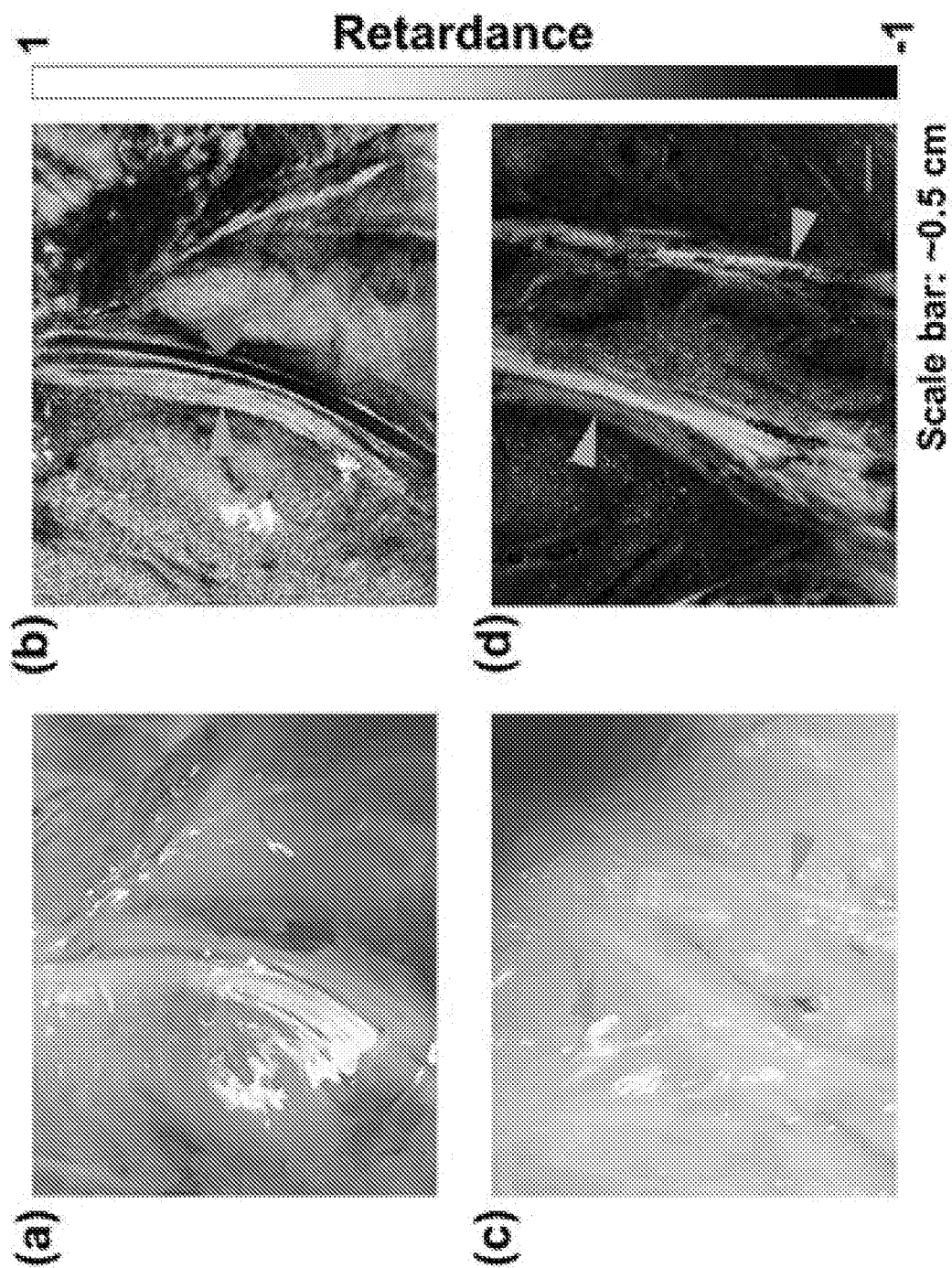
FIG. 4A is a schematic that shows RGB images and birefringence maps of four nerve regions in pigs in si/u. Nerves were carefully pre-identified before polarimetric imaging (green arrows, on both the RGB and birefringence images (a) RGB image and (b) birefringence map of a region with a branch of the superior laryngeal nerve within it. (c) RGB image and (d) birefringence map of small peripheral nerve branches surrounded mostly by fat tissue. Red diamonds in (a) and (b) indicate fat tissues.

Polarimetric images were collected from small SLN branches in swine in situ. We first carefully dissected the pigs to expose the major branches of the SLN on the neck. From the major branches, we traced the nerve to identify downstream branches of the SLN. Then we acquired the birefringence map of this region. Pronounced birefringence was observed from the major nerve branch in the map (FIG. 4A(b)). In contrast, the tissue indicated by the red diamond-shaped marker in FIG. 4A(a) and (b), which could be composed of fat, has overall very low or negative birefringence values. Although the nerve and the other tissue have very similar colours in terms of RGB values as shown in FIG. 4A(a), our imaging method was able to differentiate them with high contrast. We also tested this imaging strategy on the porcine pelvis, in which there are many small branches of peripheral nerves underneath fat tissue. We cautiously identified two small branches of the nerves based on anatomical knowledge and the experience of our surgeons, and then imaged them using the polarimetry system. Similar to our previous result, even though the nerves and fat look very similar in the RGB images (FIG. 4A(c)), our imaging and analysis system was able to distinguish the nerves from the surrounding tissues (FIG. 4A(d)).

Figure 4B:
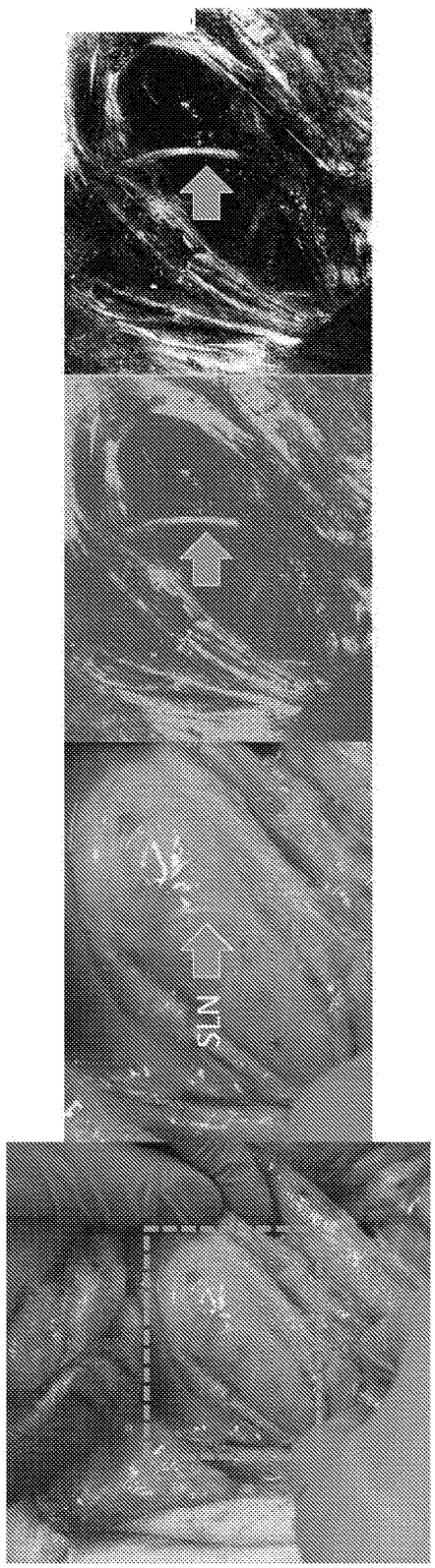
Figure 4B:
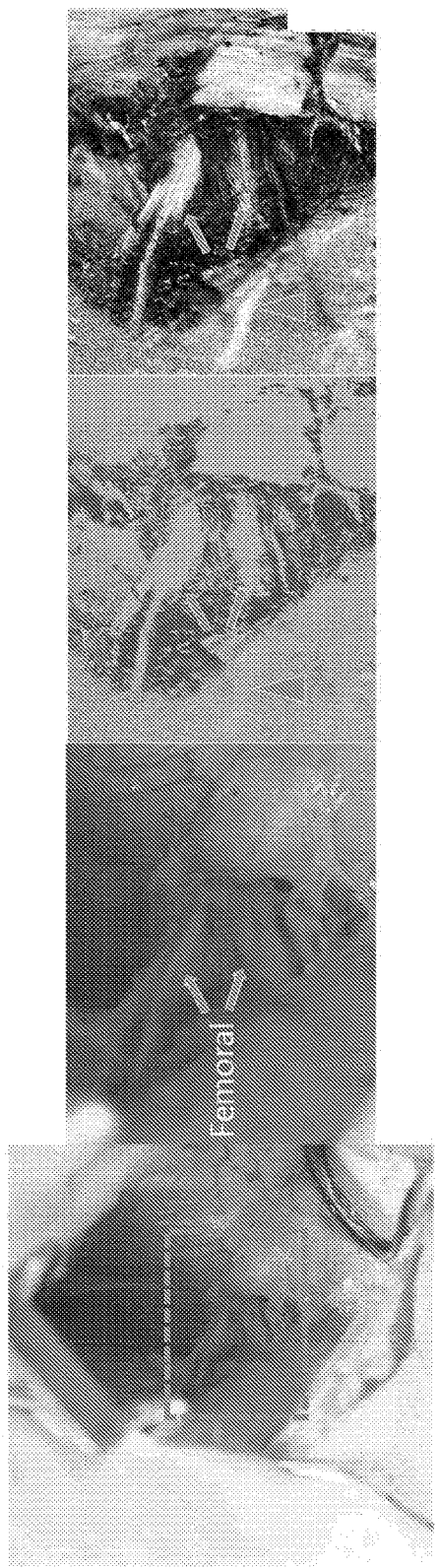

With reference now to FIG. 4B, a live animal study was performed with consideration to animal motion, including breathing. FIG. 4B illustrates representative results that show RGB images and birefringence maps of superior laryngeal nerve (SLN) in a swine neck and femoral nerves in a right leg of a swine in vivo. FIG. 4B(a) shows that the SLN identified by an expert surgeon (green arrow) during dissection and imaged on both the RGB and birefringence map in real-time. FIG. 4B(b) shows that the femoral nerves are identified by an expert surgeon (green arrows) and imaged on both the RGB and birefringence map in real-time without motion artifacts. The results clearly show that the SLN from surrounding thyroid tissue and the femoral nerves in a swine can be highlighted by the real-time birefringence map acquired from FIG. 1B system.

Nerve damage during surgery is unfortunately still a significant cause of morbidity and loss of decease of life. One of the reasons for this is the difficulty in isolating nerve structures from surrounding tissues by the naked eye. This work demonstrates the capability of snapshot polarimetry to intraoperatively distinguish nerves from surrounding tissues. Encouraged by the availability of a fast and compact polarimetric camera, we developed a practical imaging method for intraoperative nerve identification. Mapping of birefringence was achieved via three snapshots of the camera to highlight the fibrillar structures of nerves as contrast against the surrounding tissue. To this end, we have made the important first step of proving this concept and demonstrating the feasibility of our simple system setup, which can be easily adapted for surgery. Unlike other techniques that have been used to identify nerves, snapshot polarimetry is non-invasive, less interruptive with no risk of nerve damage than neuromonitoring device, which is clinically available but invasive and takes more times with interruption of the surgical workflow. Potential clinical applications will include identification of facial nerves during head and neck surgery, differentiation of RLN during thyroidectomy and patent ductus arteriosus (PDA) ligation, and visualization of pelvic nerve during pelvic organ surgery, where nerves are commonly surrounding by blood, fat and other connection tissues.

Future developments in the fast switching of polarized illumination and in multi-modality imaging could further increase acquisition speeds and reduce interference from unwanted birefringent tissues. To minimize image-contrast interference from smooth muscles, an alternative could be to utilize another imaging modality, such as hyperspectral imaging, to separate them from nerves via their reflectance spectrum. Quantitative analysis of birefringence in the surgical field could also help to reduce the interference, as the retardance of nerves could be quantitatively different from others. Considering its easy mechanism and the promising performance in our study, this novel method holds great potential for real-time non-invasive and convenient nerve visualization. In other implementation, neuromonitoring in vivo to further characterize the sensitivity and specificity of the system may be used.

Methods

Setup of the Platform

The practical imaging platform (FIG. 1A(a)) employs a newly released CMOS linear polarizer array camera (BFS-U3-51S5P-C, FLIR, U.S.A.). The camera can provide a resolution of 2448×2048 with a maximum frame rate of 75 frames/s. It consists of a monochromatic polarized sensor in which each individual pixel has its own polarizing filter, oriented to 0°, 45°, 90°, or 135° and arranged in repeating two-by-two-pixel blocks of the same, as shown by the dash-outlined rectangle in FIG. 1A(a). Each Stokes vector needs to be calculated based on the detected intensities of the four pixels, thus the resolution of the birefringence map is 1224×1024. A high-magnification lens (Zoom 7000, NAVITAR, U.S.A.) is attached to the camera for imaging. For the illumination, a 730-nm LED (M730L4, Thorlabs, U.S.A.) is combined with a linear polarizer (LPVISE100-A, Thorlabs, U.S.A.) to generate polarized input light. As indicated above, the illumination may be provided by one or more light sources and one or more linear polarizers, the one or more light sources having adjustable wavelengths between 400 nm and 2500 nm. The linear polarizer is mounted on a motorized rotator (PRM1Z8, Thorlabs, U.S.A.) to control the polarization. Though it can be appreciated that other rates of rotation may be appropriate pursuant to requirements of a given application, the rotator for each study herein was operated to rotate at a predetermined rate of 45° per second. All the components are mounted on an aluminium bread board, which is fixed on a rigid steel arm (MG61033, Noga, Israel) for intraoperative use. To operate the system and run the algorithm to derive the birefringence maps, a Python program was developed to control the camera and motorized rotator, and to perform imaging processing on a connected laptop (OMEN 15, HP, U.S.A.). The entire procedure to acquire one birefringence image required about 10 s, which included ~6 s for rotating the polarizer and ~4 s for calculation.

Derivation of the Mueller Matrix and Extraction of Phase Retardance

Given the character of the polarizer array, the Stokes vector S for each 4-pixel block can be calculated directly, based on its definition as:

$$S = \begin{bmatrix} H+V \\ H-V \\ F^+ - F^- \end{bmatrix},$$

where $H$, $V$, $F^+$ and $F^-$ are the intensities acquired from the pixels for which the orientations of the polarizers are 0°, 45°, 90°, and 135° respectively. Since we can only determine three elements of S, the Mueller matrix M is transformed into a 3×3 matrix, and for each block we can write $$MS_{in} = S_{out},$$

where $S_{in}$ and $S_{out}$ are the Stokes vectors of the illumination and detected light. Three different input polarization states are used, which are selected to be H, V, and F+. An expression for M can then be derived:

$$M = [S_{out1} \; S_{out2} \; S_{out3}] \begin{bmatrix} 1 & 1 & 1 \\ 1 & 0 & -1 \\ 0 & 1 & 0 \end{bmatrix}^{-1}.$$

$S_{out1}$, $S_{out2}$, and $S_{out3}$ represent the three respectively acquired Stokes vectors when H, V, and F+ are used as the polarizations of the illuminating light.

After the Mueller matrix is obtained, a polar decomposition method can be applied so that 44 can be decomposed into a sequence of three solvable matrix factors, $$M = M_\Delta M_R M_D,$$

where $M_\Delta$, $M_R$, and $M_D$ represent the depolarization, retardance, and diattenuation parts of M respectively. $M_R$ can be derived, and the phase retardance δ between the fast and slow axes of the birefringence can be determined using the elements of $M_R$:

$$\cos(\delta) = \sqrt{(M_R(2,2) + M_R(3,3))^2 + (M_R(2,3) - M_R(3,2))^2} - 1,$$

in which $M_R(x,y)$ denotes the element in xth column and yth row. In our study, cos (δ) is used as the retardance value for the construction of the birefringence maps.

Animal Experiment Protocols

For in vivo studies on rats, male and female 250-350 g Sprague-Dawley rats (n=2) from Charles River Laboratories (Wilmington, Massachusetts, U.S.A.) were used for this experiment. A 3-min inhalation of 4% Isoflurane was used for sedation and restraint. Anaesthesia was maintained using intramuscular injections of Xylazine (2 mg/kg) and Ketamine (75 mg/kg). All procedures were performed at the animal research facility under institutional animal care and use committee under approved protocol (IACUC #30597). After ensuring sterile conditions, femoral nerve and phrenic nerves were carefully dissected and exposed at their junctions with the inguinal ligament and clavicle level, respectively. Both nerves were imaged using a snapshot camera in vivo.

For the in situ studies on swine, female Yorkshire 10-kg pigs (n=2) from Archer Farms (Darling, Maryland, U.S.A.) were used. The pigs were sedated by intramuscular injection of xylazine-ketamine anaesthetic and a 3-min inhalation of 4% Isoflurane was used and maintained for anaesthesia. After ensuring sterile conditions, the skin was cut from the lower jaw tip to the caudal throat and, together with the subcutaneous fat tissue (separated, distinctly light white adipose tissue), moved laterally. The ventral portion of the superficial neck muscle was exposed. RLN and SLN were dissected and targeted for the imaging. Small branches of peripheral nerves inside fat tissues around skin were exposed and the data were collected for nerve differentiation from surrounding fat tissues. The ventilation was paused for snapshot imaging and euthanized by administering Beuthanasia (1 ml per 4.5 kg of body weight) through ear vein following our approved protocol (IACUC #30591) strictly. We confirmed the death by checking for respirations and heart tones.

Figure 5:
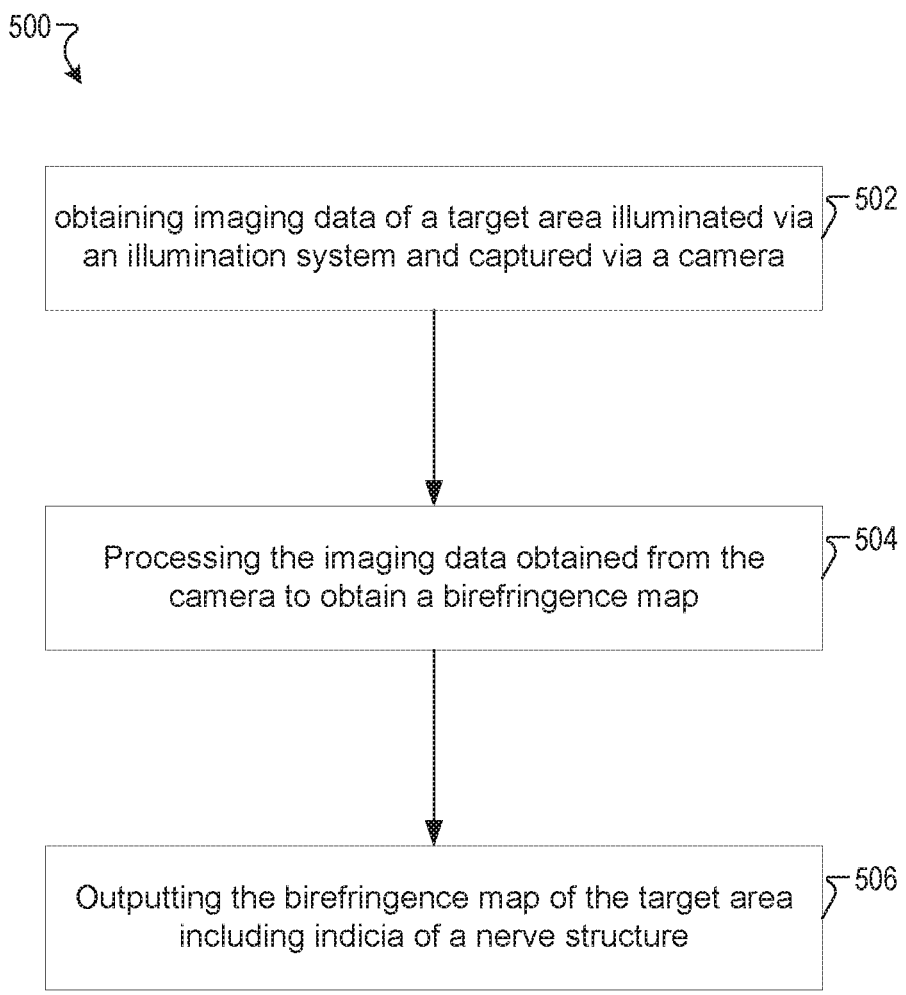
FIG. 5 is a flowchart for a nerve identification process according to one example.

FIG. 5 is a flowchart for a nerve identification process 500 according to one example. At S502, imaging data of a target area illuminated via the illumination system described herein and captured via the camera described herein are obtained.

At S504, the imaging data are processed using a processor to obtain a birefringence map. At S506, the birefringence map of the target area including indicia of a nerve structure is output.

The processor may be in the camera, in the illumination system, or implemented in circuitry of a display. The processor may also be a computer or a server (e.g., a cloud server) connected to the system via a network.

The network 102 is any network that allows the computer, camera, illumination system, display, and/or third party device to communicate information with each other. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The features of the present disclosure provide a multitude of improvements in the field of medical imaging. In particular, a snapshot polarimetry system is described as a potential real-time, non-invasive surgical vision tool for guiding surgeons during surgery to recognize the unidentifiable nerve tissues with situational awareness. The imaging technique described herein can provide such information to surgeons intraoperatively with minimal interruption of the surgical workflow. We demonstrated the feasibility of intraoperative nerve identification with excellent contrast through in vivo animal studies both in rats and pigs, which offers the possibility of truly non-invasive imaging in clinical settings. It holds a great promise for improving surgical outcomes and reducing rates of iatrogenic injuries.

Figure 6:
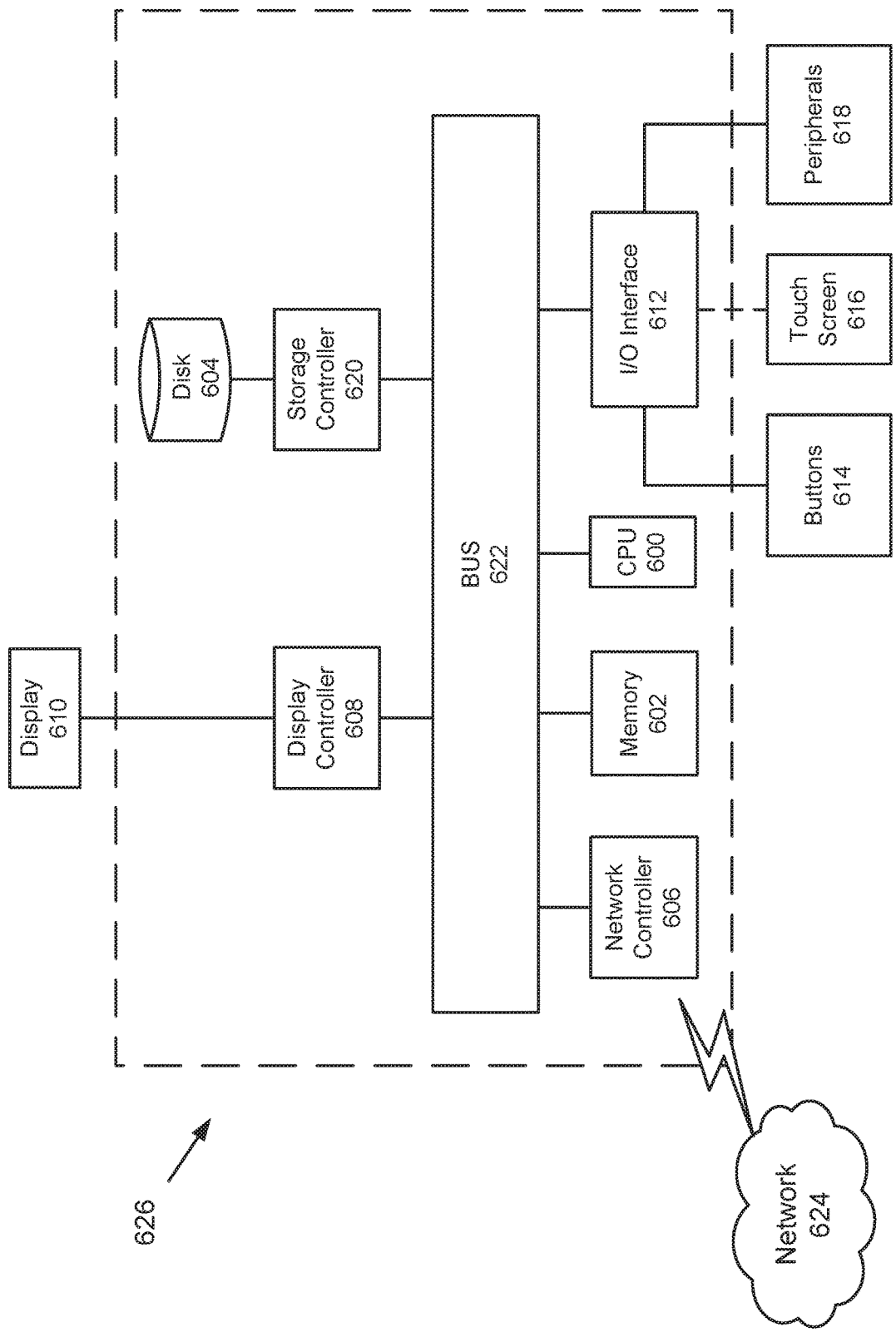
FIG. 6 is an exemplary block diagram of a computer according to one example.

In one implementation, the functions and processes described herein may be implemented by a computer 626. Next, a hardware description of the computer 626 according to exemplary embodiments is described with reference to FIG. 6. In FIG. 6, the computer 626 includes a CPU 600 which performs the processes described herein. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 626 communicates, such as a server or computer.

Further, the claimed advancements may be provided as a utility application, background daemon, or component of an operating system, or combination thereof, executing in conjunction with CPU 900 and an operating system such as Microsoft® Windows®, UNIX®), Oracle® Solaris, LINUX®, Apple macOS® and other systems known to those skilled in the art.

In order to achieve the computer 626, the hardware elements may be realized by various circuitry elements, known to those skilled in the art. For example, CPU 600 may be a Xenon® or Core® processor from Intel Corporation of America or an Opteron® processor from AMID of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computer 626 in FIG. 6 also includes a network controller 606, such as an Intel Ethernet PRO network interface card from Intel Corporation of America, for interfacing with network 624. As can be appreciated, the network 624 can be a public network, such as the Internet, or a private network such as LAN or WAN: network, or any combination thereof and can also include PSTN or ISDN sub-networks. The network 624 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 626 further includes a display controller 608, such as a NVIDIA® GeForce® GTX or Quadro® graphics adaptor from NVIDIA Corporation of America for interfacing with display 610, such as a Hewlett Packard® HPL2445w LCD monitor. A general purpose I/O interface 612 interfaces with a keyboard and/or mouse 614 as well as an optional touch screen panel 616 on or separate from display 610. General purpose I/O interface also connects to a variety of peripherals 618 including printers and scanners, such as an OfficeJet® or DeskJet® from Hewlett Packard®.

The general purpose storage controller 620 connects the storage medium disk 604 with communication bus 622, which may be an ISA, EISA, VESA, PCI, or similar, for interconnecting all of the components of the computer 626. A description of the general features and functionality of the display 610, keyboard and/or mouse 614, as well as the display controller 608, storage controller 620, network controller 606, and general purpose I/O interface 612 is omitted herein for brevity as these features are known.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A system for nerve identification, the system comprising a camera including a sensor, and a filter having a linear polarizer array, an illumination system configured to illuminate a target area with polarized light illumination, the polarized light illumination having at least one predetermined polarization angle, the illumination system including one more light sources, and one or more polarizer filters, and a processor configured to process imaging data obtained from the camera, and output a birefringence map of the target area including indicia of a nerve structure.

(2) The system of (1), wherein the filter and the sensor are aligned and every predetermined number of pixels of the sensor overlays a predetermined number of linear polarizers of the linear polarizer array.

(3) The system of either (1) or (2), wherein the predetermined number of pixels is four and angles of axes of the linear polarizers are 0°, 45° 90°, and 135°.

(4) The system of any one of (1) to (3), wherein the one or more light sources are low power light emitting diodes.

(5) The system of any one of (1) to (4), wherein each of the one or more polarizer filters is a linear polarizer coupled to a motorized rotator, the motorized rotator being configured to rotate the linear polarizer at a predetermined rate.

(6) The system of any one of (1) to (5), wherein the camera is configured to obtain at least three shots of the target area, each associated with a position of the linear polarizer.

(7) The system of any one of (1) to (6), wherein the predetermined rate of rotation of the linear polarizer is at least 45° per second.

(8) The system of any one of (1) to (7), wherein each of the one or more polarizer filters is a linear polarizer with a fixed polarization angle.

(9) The system of any one of (1) to (8), wherein the at least one predetermined polarization angle is one or more of 0°, 450, and 90°.

(10) The system of any one of (1) to (9), wherein the one or more light sources are configured to emit light having an adjustable wavelength.

(11) The system of any one of (1) to (10), wherein the one or more light sources are configured to emit light having a wavelength between 400 nm and 2500 nm.

(12) The system of any one of (1) to (11), wherein the processor is further configured to determine a Mueller matrix associated with each predetermined polarization angle based on the imaging data, determine a phase retardance based on the Mueller matrix, and determine the birefringence map based on the phase retardance.

(13) The system of any one of (1) to (12), wherein the system is configured for intraoperative, non-invasive surgery and/or semi-or fully autonomous surgery.

(14) The system of any one of (1) to (13), wherein the processor is configured to perform real-time processing of the imaging data received by the camera.

(15) The system of any one of (1) to (14), wherein a view of the camera has an adjustable spatial resolution.

(16) A method for nerve identification using a system that includes a camera including a sensor, and a filter having a linear polarizer array, an illumination system configured to illuminate a target area with polarized light illumination, the polarized light illumination having a at least one predetermined polarization angle, the illumination system including one or more light sources, and one or more polarizer filters, the method comprising processing imaging data obtained from the camera, and outputting a birefringence map of the target area including indicia of a nerve structure.

(17) The method of (16), wherein the filter and the sensor are aligned and every predetermined number of pixels of the sensor overlays a predetermined number of linear polarizers of the linear polarizer array.

(18) The method of either (16) or (17), wherein the predetermined number of pixels is four and angles of axes of the linear polarizers are 0°, 45° 90°, and 135°.

(19) The method of any one of (16) to (18), wherein the one or more light sources are low power light emitting diodes.

(20) The method of any one of (16) to (19), wherein the each of the one or more polarizer filters is a linear polarizer coupled to a motorized rotator, the motorized rotator being configured to rotate the linear polarizer at a predetermined rate.

(21) The method of any one of (16) to (20), wherein the camera is configured to obtain at least three shots of the target area, each associated with a position of the linear polarizer.

(22) The method of any one of (16) to (21), wherein the predetermined rate of rotation of the linear polarizer is 45° per second.

(23) The method of any one of (16) to (22), wherein each of the one or more polarizer filters is a linear polarizer with a fixed polarization angle.

(24) The method of any one of (16) to (23), wherein the at least one predetermined polarization angle is one or more of 0, 45°, and 90°.

(25) The method of any one of (16) to (24), wherein the one or more light sources are configured to emit light having an adjustable wavelength.

(26) The method of any one of (16) to (25), wherein the one or more light sources are configured to emit light having a wavelength between 400 nm and 2500 nm.

(27) The method of any one of (16) to (26), further comprising automatically adjusting the adjustable wavelength of the one or more light sources based on lighting conditions.

(28) The method of any one of (16) to (27), further comprising determining a Mueller matrix associated with each predetermined polarization angle based on the imaging data, determining a phase retardance based on the Mueller matrix, and determining the birefringence map based on the phase retardance.

(29) The method of any one of (16) to (28), wherein the system is configured for intraoperative, non-invasive surgery and/or semi-or fully autonomous surgery.

(30) The method of any one of (16) to (29), wherein the processor is configured to perform real-time processing of the imaging data received by the camera.

(31) The method of any one of (16) to (30), wherein a view of the camera has an adjustable spatial resolution.

(32) A method for nerve identification, the method comprising obtaining raw polarimetric data from a target area associated with each of a plurality of illumination polarization, converting the raw polarimetric data into a birefringence map, and outputting a graphical representation of the birefringence map.

(33) The method of (32), wherein the birefringence map is an enhanced contrast birefringence map.

(34) The method of either (33) or (34), further comprising separating nerving using reflectance.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below. Other alternative embodiments include that which can be embodied in the disclosures provided herein in this application and implemented by hardware identical to or similar to that described in FIG. 6.

The invention claimed is:

1. A system for nerve identification, the system comprising:
   a camera including
      a sensor, and
      a filter having a linear polarizer array;
   an illumination system configured to illuminate a target area with polarized light illumination, the polarized light illumination having a plurality of predetermined light polarization angles, the illumination system including
      one more light sources, and
      one or more polarizer filters; and
   a processor configured to
      process imaging data obtained from the camera, and
      output a birefringence map of the target area including indicia of a nerve structure, wherein
   the linear polarizer array includes a repeating grid of linear polarizers, a first linear polarizer in each grid has a first angle of axis of 0°, a second linear polarizer in each grid has a second angle of axis of 45°, a third linear polarizer in each grid has a third angle of axis of 90°, and a fourth linear polarizer in each grid has a fourth angle of axis of 135°, the plurality of predetermined light polarization angles include a first predetermined light polarization angle, a second predetermined light polarization angle, and a third predetermined light polarization angle, and the first predetermined light polarization angle, the second predetermined light polarization angle, and the third predetermined light polarization angle each correspond to an angle of axis selected from 0°, 45°, and 90°, which are each angles of axis of the linear polarizer array.

2. The system of claim 1, wherein the filter and the sensor are aligned and every predetermined number of pixels of the sensor overlays a predetermined number of linear polarizers of the linear polarizer array.

3. The system of claim 2, wherein the predetermined number of pixels is four.

4. The system of claim 1, wherein each of the one or more polarizer filters is a linear polarizer coupled to a motorized rotator, the motorized rotator being configured to rotate the linear polarizer at a predetermined rate.

5. The system of claim 4, wherein the camera is configured to obtain at least three shots of the target area, each associated with a position of the linear polarizer.

6. The system of claim 1, wherein each of the one or more polarizer filters is a linear polarizer with a fixed polarization angle.

7. The system of claim 1, wherein the one or more light sources are configured to emit light having a wavelength between 400 nm and 2500 nm.

8. The system of claim 1, wherein the processor is further configured to
determine a Mueller matrix associated with each predetermined light polarization angle based on the imaging data,
determine a phase retardance based on the Mueller matrix, and
determine the birefringence map based on the phase retardance.

9. A method for nerve identification using a system that includes a camera including a sensor, and a filter having a linear polarizer array, an illumination system configured to illuminate a target area with polarized light illumination, the polarized light illumination having a plurality of predetermined light polarization angles, the illumination system including one or more light sources, and one or more polarizer filters, the method comprising:
processing imaging data obtained from the camera; and
outputting a birefringence map of the target area including indicia of a nerve structure, wherein
the linear polarizer array includes a repeating grid of linear polarizers,
a first linear polarizer in each grid has a first angle of axis of 0°, a second linear polarizer in each grid has a second angle of axis of 45°, a third linear polarizer in each grid has a third angle of axis of 90°, and a fourth linear polarizer in each grid has a fourth angle of axis of 135°,
the plurality of predetermined light polarization angles include a first predetermined light polarization angle, a second predetermined light polarization angle, and a third predetermined light polarization angle, and
the first predetermined light polarization angle, the second predetermined light polarization angle, and the third predetermined light polarization angle each correspond corresponds to an angle of axis selected from 0°, 45°, and 90°, which are each angles of axis of the linear polarizer array.

10. The method of claim 9, wherein the filter and the sensor are aligned and every predetermined number of pixels of the sensor overlays a predetermined number of linear polarizers of the linear polarizer array.

11. The method of claim 10, wherein the predetermined number of pixels is four.

12. The method of claim 9, wherein the each of the one or more polarizer filters is a linear polarizer coupled to a motorized rotator, the motorized rotator being configured to rotate the linear polarizer at a predetermined rate.

13. The method of claim 12, wherein the camera is configured to obtain at least three shots of the target area, each associated with a position of the linear polarizer.

14. The method of claim 9, wherein each of the one or more polarizer filters is a linear polarizer with a fixed polarization angle.

15. The method of claim 9, wherein the one or more light sources are configured to emit light having a wavelength between 400 nm and 2500 nm.

16. The method of claim 15, further comprising
automatically adjusting the wavelength of the one or more light sources based on lighting conditions.

17. The method of claim 9, further comprising
determining a Mueller matrix associated with each predetermined polarization angle based on the imaging data,
determining a phase retardance based on the Mueller matrix, and
determining the birefringence map based on the phase retardance.

18. A method for nerve identification, the method comprising:
obtaining raw polarimetric data from a target area associated with each of a plurality of illumination polarizations;
converting the raw polarimetric data into a birefringence map; and
outputting a graphical representation of the birefringence map, wherein
the raw polarimetric data includes pixels arranged in repeating grids,
a first pixel in each grid is associated with a first linear polarization of 0°, a second pixel in each grid is associated with a second linear polarization of 45°, a third pixel in each grid is associated with a second linear polarization of 90°, and a fourth pixel in each grid is associated with a fourth linear polarization of 135°,
the plurality of illumination polarizations includes a first illumination polarization angle, a second illumination polarization angle, and a third illumination polarization angle, and
the first illumination polarization angle, the second illumination polarization angle, and the third illumination polarization angle each correspond to an angle of axis selected from 0°, 45°, and 90°, which are each an angle of axis of a pixel in each grid.

19. The method of claim 18, wherein the birefringence map is an enhanced contrast birefringence map.

20. The method of claim 19, further comprising separating nerving using reflectance.

\* \* \* \* \*